Figure 19:
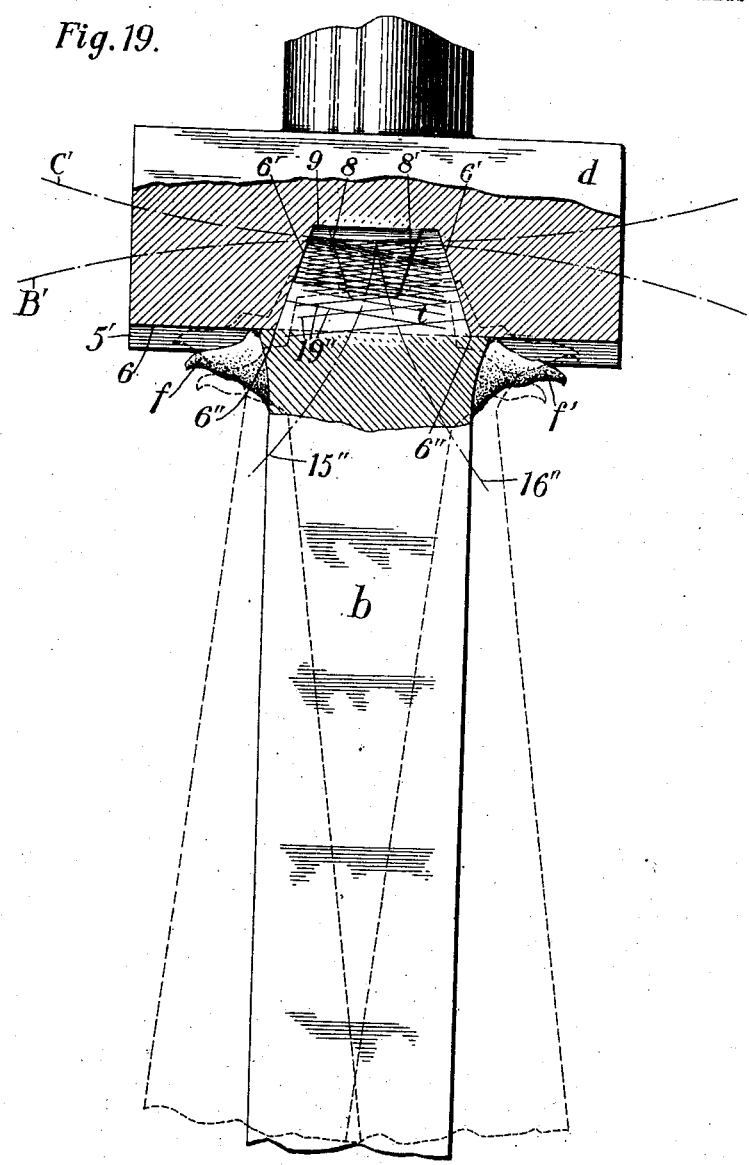

F. H. RICHARDS.
ART OF MAKING TYPES AND TYPE BARS.
APPLICATION FILED MAR. 1, 1907.
919,224.
Patented Apr. 20, 1909.
9 SHEETS—SHEET 1.
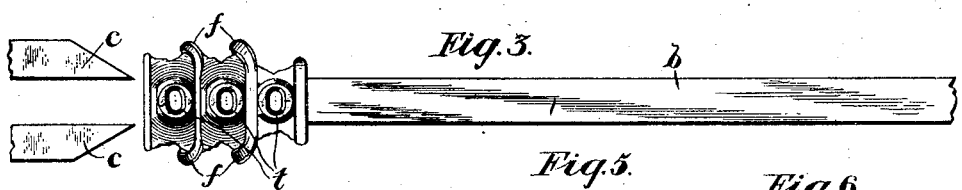
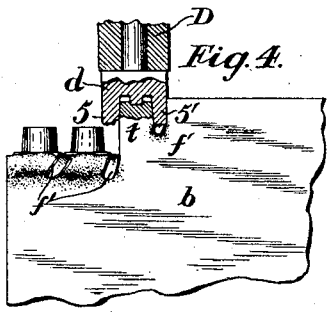
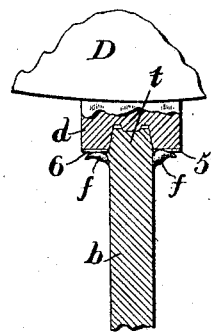
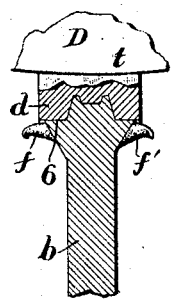
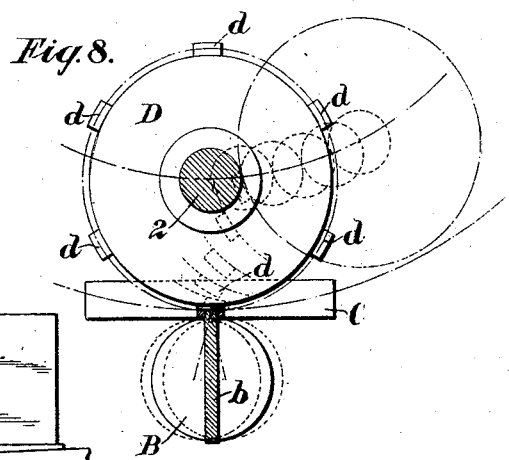
Witnesses:
Harry Fleischer
H. D. Penney
Inventor:
F. H. Richards F. H. RICHARDS.
ART OF MAKING TYPES AND TYPE BARS.
APPLICATION FILED MAR. 1, 1907.
919,224.
Patented Apr. 20, 1909.
9 SHEETS—SHEET 2.
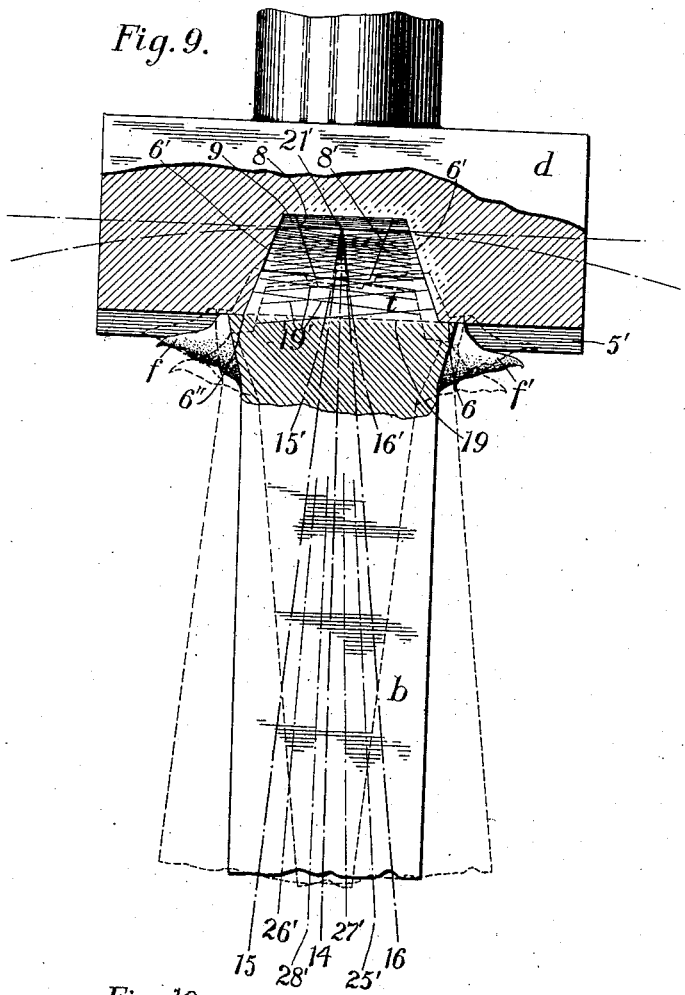
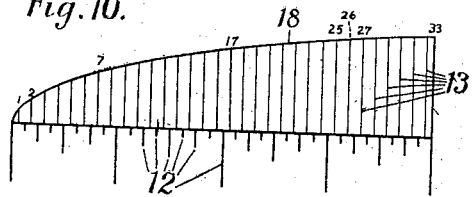

F. H. RICHARDS.
ART OF MAKING TYPES AND TYPE BARS.
APPLICATION FILED MAR. 1, 1907.
919,224.
Patented Apr. 20, 1909.
9 SHEETS—SHEET 3.
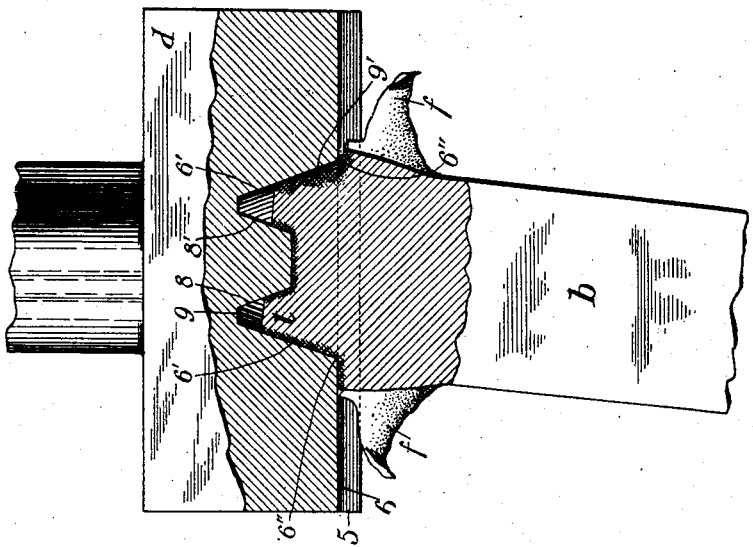
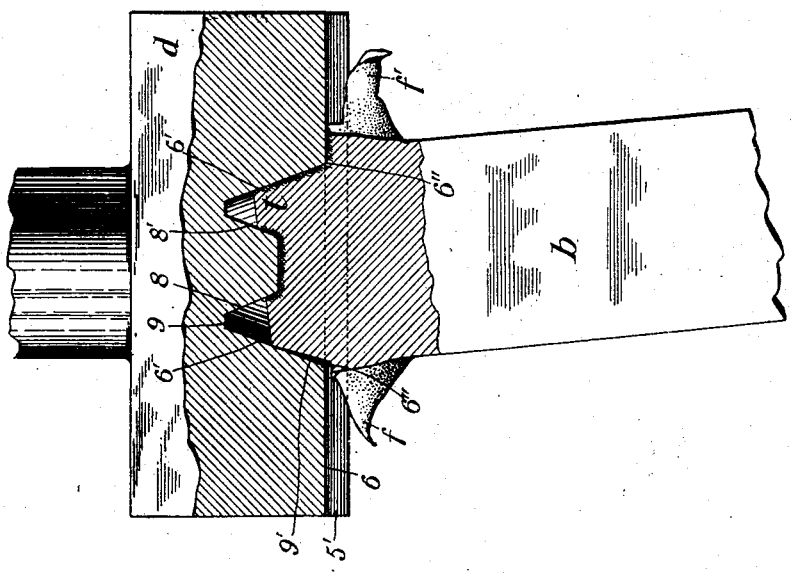
Witnesses
M. Levy.
H. D. Penney.
Inventor
F. H. Richards F. H. RICHARDS.
ART OF MAKING TYPES AND TYPE BARS.
APPLICATION FILED MAR. 1, 1907.
919,224.
Patented Apr. 20, 1909.
9 SHEETS—SHEET 4.
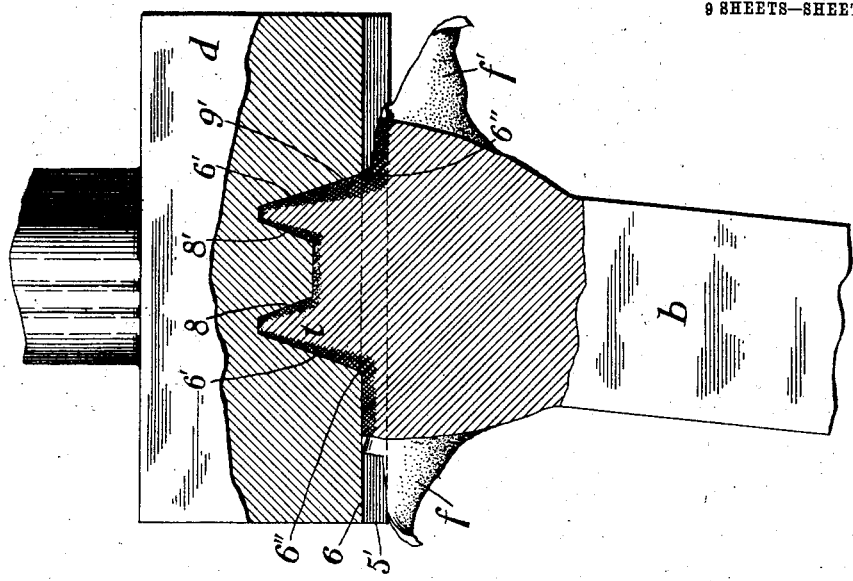
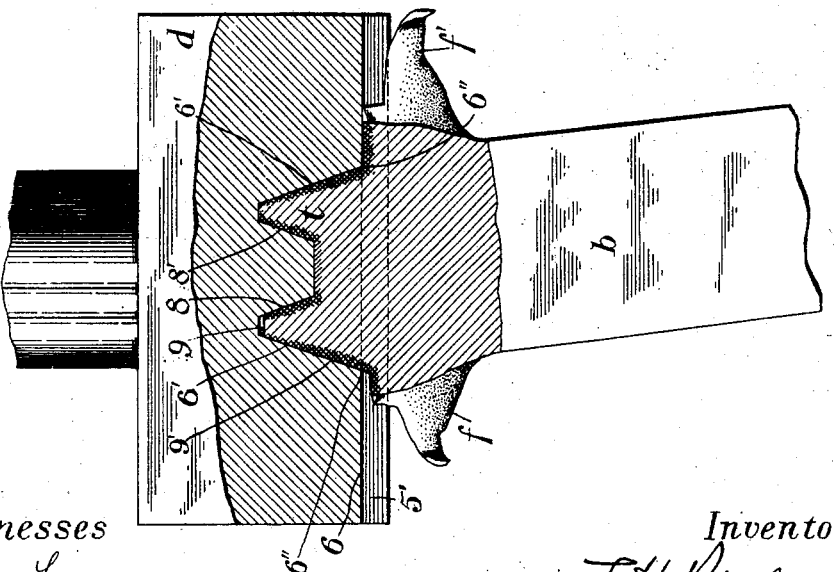
Witnesses
Inventor

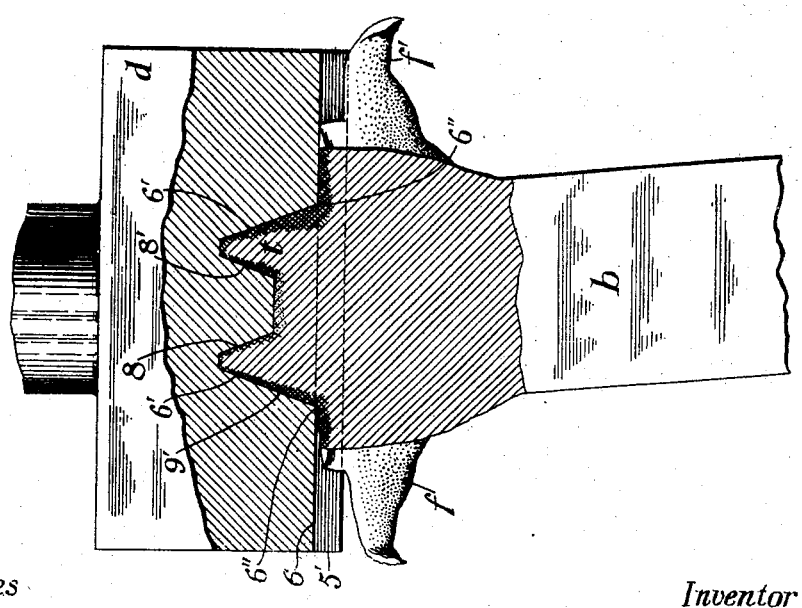

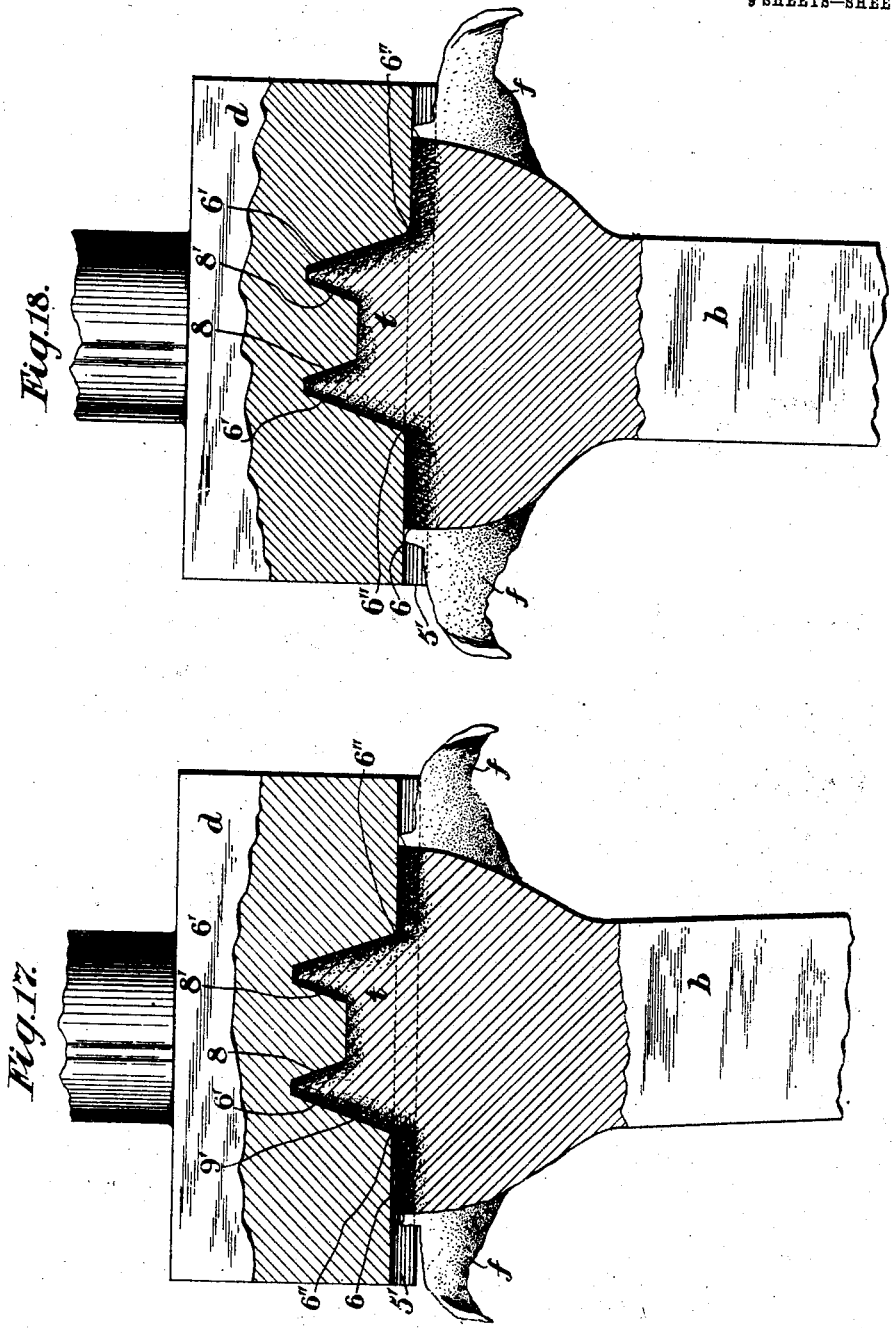

F. H. RICHARDS.
ART OF MAKING TYPES AND TYPE BARS.
APPLICATION FILED MAR. 1, 1907.

919,224.

Patented Apr. 20, 1909.
9 SHEETS—SHEET 7.

Witnesses

Inventor

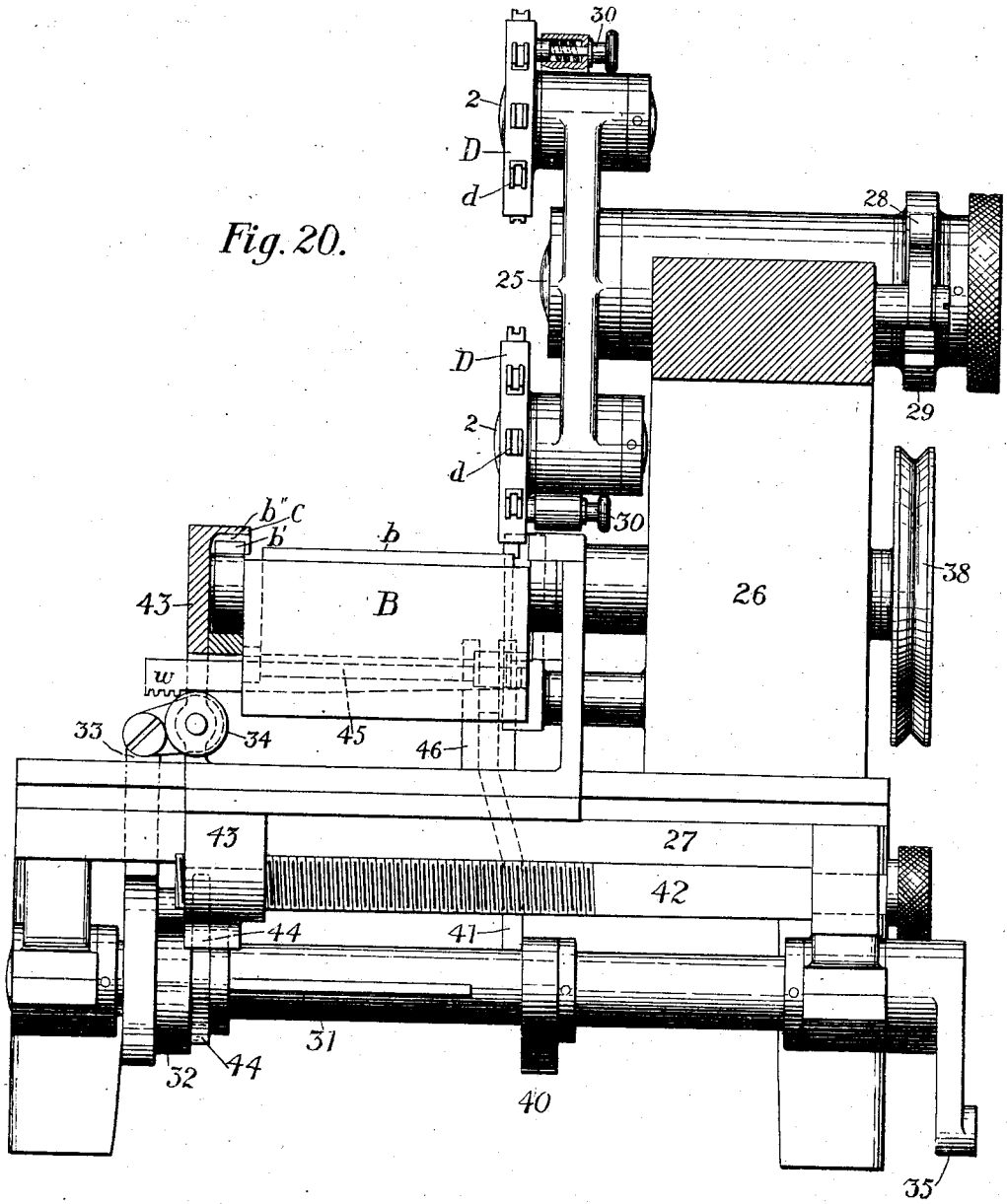

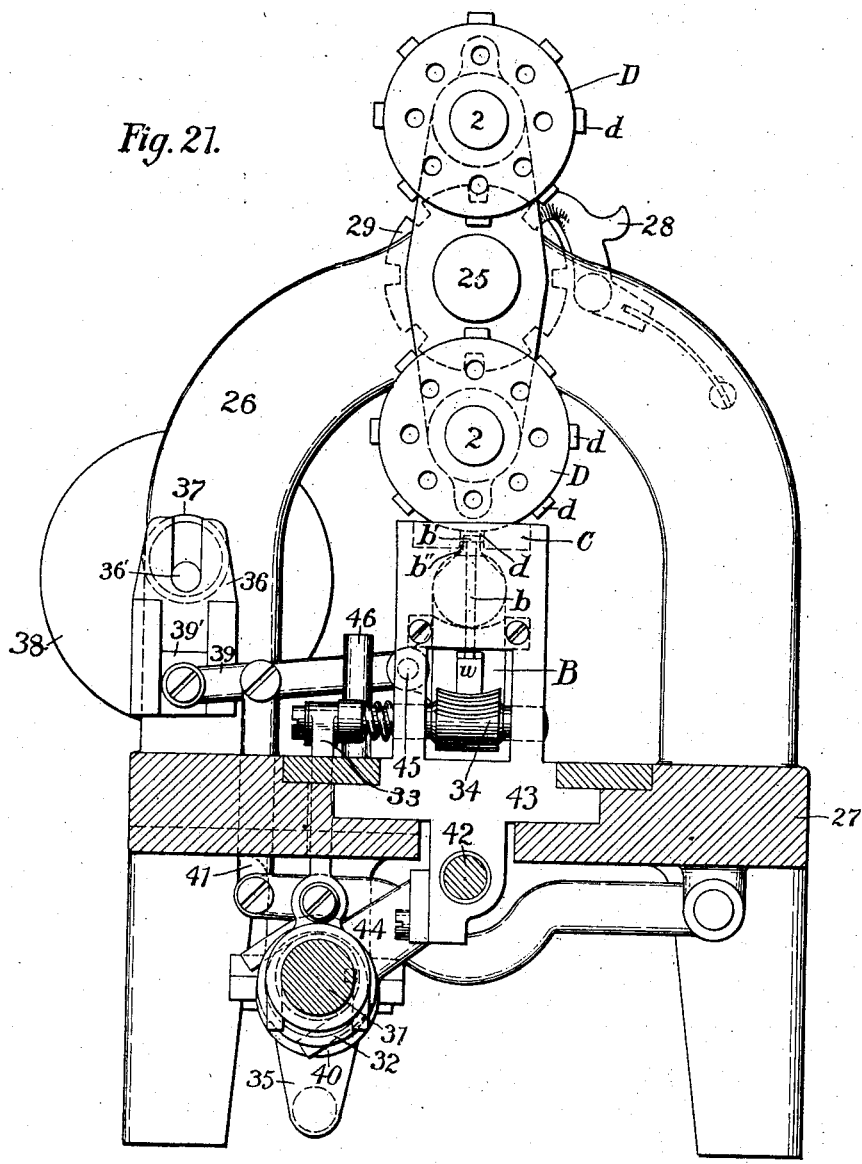

UNITED STATES PATENT OFFICE.

FRANCIS H. RICHARDS, OF HARTFORD, CONNECTICUT.

ART OF MAKING TYPES AND TYPE-BARS.

No. 919,224.      Specification of Letters Patent.      Patented April 20, 1909.

Application filed March 1, 1907. Serial No. 359,982.

*To all whom it may concern:*

Be it known that I, FRANCIS H. RICHARDS, a citizen of the United States, residing at Hartford, in the county of Hartford and State of Connecticut, have invented certain new and useful Improvements in the Art of Making Types and Type-Bars, of which the following is a specification, which is in the nature of a continuation of a former application for the same subject-matter filed by me March 9, 1906, Serial No. 305,129, and which said application is a renewal of application Serial No. 740,673, filed December 18, 1899.

This invention relates to the art of making types and type-bars, and especially to a method of making from a solid blank or bar of metal a type-bar adapted for use in the typographic art for printing a line of characters.

Two of the principal features that distinguish each of my improved processes are these: I avoid the necessity of setting off the finished type-blank before the die is brought into action, and I subject each type-formative portion of the blank to repeated rolling operations, preferably of such a character that not only will the face of the type be perfectly finished but the base portion will also be finished and strengthened to such an extent as to enable it to resist greater crushing forces and last longer.

In forming a type in stock that has not been entirely set off from the body of the blank I confine endwise of the blank, preferably between two separated lines, a portion of the edge of a type-bar blank and compress the face of this confined portion while it is in contact with a type-die, the compressing action being exerted in such a way as to force most of the surplus stock sidewise of the type-bar blank instead of endwise thereof, this surplus material so forced out being usually removed or severed from the bar after the completion of the type. The confinement of any particular portion of the blank and the compression of that portion may be effected at a single operation. Moreover, practically all of the surplus stock within any given character-field or type-field may be forced beyond the limits of such field in a direction transverse to the blank without disturbing the stock of any adjacent character-field, the flowage being almost entirely in a direction cross-wise of the type-bar blank, and the metal so forced out being afterward severed from the type-bar blank if it projects beyond the planes of the sides of the latter, as is usually the case.

The other feature that I deem of special importance in each of these processes is the gradual formation of the type by the repeated rolling of a transverse portion of the edge of the blank while in contact with a type-die, one of these two members being preferably reciprocated rapidly in a curvilinear path, in order that the type during the process of formation may be subjected to repeated rollings. In connection with this repeated rolling of the blank a feed movement may be imparted to one of the members to bring it more and more fully into engagement with the other, the result being that the type is gradually shaped to its finished form by a series of operations which co-act to finish the type perfectly and also to strengthen the body of the type very materially during the shaping of the latter.

In the present case there is no oscillation of either of the parts about a fixed axis, but instead one of them is rolled in a cycloidal path back and forth, and, therefore, has not merely a swinging movement but also moves bodily toward and from the other, and hence when the parts come together the shaping of the type-face is effected by a movement more in the nature of a blow than mere pressure. In the present case the blank is rolled—that is, a rolled type is formed—by actuating one of the two coacting members—viz., the die and the blank—in a cycloidal path while in contact with the other, and all of the various operations to which the material is subjected during the formation of the type may result from two main movements—viz., a rolling movement of one member, and a feed movement of one member toward the other. These two movements may be varied as to their extent, duration, etc., and thus the operations to which the material is subjected may also be varied, but in every case where these two movements are employed each type will be formed gradually, and the type-formative material will be subjected to various operations that will condense the metal and result in the formation of a wrought-metal type. The rolling movement or cycloidal movement employed in the present process differs essentially from an oscillating movement, and is in its effect upon the blank, as well as in reality, a composite operation. In the oscillating process, where the feed movement is coincident with the oscillation, the blank has only those two movements, but in this case, where the rolling movement is coincident with the feed, the blank has three principal movements, one of which is the lateral swing, another the feed toward the die, and the third a reciprocatory additional movement toward and from such die. This third movement is not present when the types are formed by the oscillating process, and hence there is no such reciprocation of the blank toward and from the die. Owing to this fact the face of a type in the oscillating process is swaged into shape almost entirely by pressure and is not shaped to form by repeated sharp blows, as is the case when the rolling process is employed and the blank has this extra movement in addition to the swing and the feed. Although all of these operations are conducted upon a somewhat minute scale in actual practice, yet the distinction between the two processes is important and the operations result in the shaping of the material in very different ways.

The principal operations to which the material will be subjected will be the rolling of the upper or face portion of the blank, the swaging of the face of the type, and the forging of the end walls thereof. The order in which these operations occur may of course vary, as may also the duration and extent of the same, and, of course, as any one of these factors is varied, the manner in which and the extent to which the material is operated upon and shaped will show a corresponding variation. In every case, however, I deem it desirable to shear out a type-block, usually on the edge of a type-bar blank, and to roll the material at opposite sides of such block away from the latter and preferably beyond the sides of the type-bar blank, this material, outside of the sheared type-block, containing most of the excess which it is necessary to get rid of if the types are to be formed thereon in close succession. When such material between the sides of the type-bar blank is rolled in this manner substantially all of the flowage is in a direction transverse to the blank, and there is practically no flowage lengthwise of the bar, and especially when the rolled portion of the stock is substantially continuous with the remainder of the type-bar blank.

The major portion of the surplus material is gotten rid of by rolling it away from a point where it will interfere with the formation of type to a point where it will not so interfere, and preferably to a point or points beyond the sides of the bar, and the type itself is formed by shaping the material of the central type-block sheared from the mass at any given point. The shearing of this type-block and the formation of the type therefrom may be partially simultaneous or distinct and successive operations if desired. In the present case this surplus material and the type-block or type-blank are operated upon substantially simultaneously, and during the time that the excess material is being rolled beyond the sides of the bar the type-block is also being shaped to bring it to its finished form. For this reason I deem it advantageous to make use of a die so constructed as to be capable of operating upon both the type-block and the excess material at opposite sides of such block. When the blank and the die are in contact with each other, and one of them is oscillated and a feed movement is also imparted to one of them to advance it toward the other, the type-block will be sheared gradually from the mass and the surrounding material will be rolled off while the shearing operation is taking place. Moreover, the type-die will also operate upon the type-block to shape the same into a type before the completion of the shearing action, and also, of course, before all of the surrounding excess material has been rolled beyond the sides of the bar. As the rolling and feeding operations continue the base of the type-block is reduced at opposite sides of the bar and the metal condensed by a forging action and the upper portion of the type-block is forced up to fill the die, which serves to swage the face of the block and shape the face of the type. Thus not only may the die be completely filled and the face of the type perfectly formed, but the end walls of the latter will be so condensed by the forging operation as to form a base having the maximum amount of strength for supporting the head of the type and resisting any crushing force that may be exerted upon the latter when in use.

In the drawings accompanying this specification, Figures 1 and 2 are, respectively, a plan and a side elevation representing a type-bar made by my improved process. Fig. 3 is a plan upon a somewhat larger scale than the preceding figures of a portion of a partially-finished bar, and illustrates the appearance of the finished and partially-finished types on the edge of a type-bar blank. Fig. 4 is a side elevation of one end of the same, illustrating in section the operation of a die for forming a character. Figs. 5 and 6 are sectional, end elevations illustrating, respectively, the initial and final stages of the operation of forming a type. Fig. 7 is a side elevation of a die-wheel and a blank-feeding wedge coöperating with a type-bar blank, the parts being shown on the same scale as in Figs. 1 and 2. Fig. 8 is a sectional, end elevation of the same with the wedge omitted, and includes also means for imparting a rolling movement to the blank. Fig. 9 is a sectional, end elevation of a portion of a die and a type-bar blank considerably enlarged, and illustrates diagrammatically certain movements and positions, which will be hereinafter more fully described. Fig. 10 is a diagrammatic view illustrating the variable feed movement which I prefer to impart to one of the members when the die and the blank are in contact with each other. Figs. 11 to 18, inclusive, are views similar to Fig. 9, and illustrate successive steps in the operation of forming a type; Fig. 19 is a view similar to Fig. 9, and illustrates the manner in which types and type-bars may be formed by a rolling movement about a curve instead of along a straight line; and Figs. 20 and 21 are elevational views of a simple species of mechanism designed to produce a type, and a succession of the same according to my method as disclosed herein.

Similar characters designate like parts in all the figures of the drawings.

In the production of type-bars suitable for the purposes of typography, it is desirable for many reasons to make types and type-bars of the highest quality in the simplest manner—that is, with the smallest possible number of tools—and the principal object of the present improved process is to attain these results and thus permit the manufacture, in the most economical manner, of type-bars that will withstand the most rigid tests of commercial use. In order to obtain these results it has been found advantageous, although of course it is not absolutely necessary, to form each type by means of a single tool or die coacting with a proper blank, and to so operate one or both of these members relatively to the other or to each other as to compact and condense most perfectly the material of the type proper before the completion of the same. The many experiments that were made to determine the best method of forming types and type-bars from blanks demonstrated that it was desirable to condense the metal of the finished type as much as possible both at the face of the type and near the base thereof, and it was also found that the dies filled more perfectly and the types were of maximum strength when the material was subjected to repeated rollings and each type gradually formed by a series of operations, which might be either a sequence of movements of the same kind and extent, or a sequence of movements of different kinds of different extents, or a sequence of movements varying both in kind and extent.

Two principal movements are utilized ordinarily in practicing my improved process, one of them being usually a reciprocatory movement in a curvilinear path and the other a feed movement. This reciprocatory curvilinear movement may be one of variable extent, as may also the feed movement, and in the preferred mode of practicing my invention the former will be varied only during certain stages of the operation, while the latter may vary progressively throughout substantially the whole period of operation. When these two movements are combined, as is the case in the process illustrated in the drawings of this application, not only will each type be formed gradually by repeated reductions and shapings to the type-formative material, but the amount of the work accomplished during any given period of time by any particular movement may also vary, and thus the extent to which the type-block is shaped at a given moment may also be varied, and the point or surface at which the action takes place may be moved in order to produce the desired results. The blank may be subjected to these repeated operations in any suitable manner, but while hand-operated tools may be employed for the purpose, suitable mechanism will ordinarily be used. Moreover, while different tools may be employed for operating upon each separate face of a type-block or type-blank, I have deemed it preferable to make use of a single tool or die, as when one of the two coöperating members is moved properly relatively to the other a single die is sufficient to subject the type-blank to all of the various operations which it undergoes before becoming a finished type. Any proper type-die may be employed, and this may be mounted in any desired manner, though I prefer to support one or more type-dies, such as $d$, on a carrier, such as D, which carrier may be secured to a shaft, such as 2, having a movement of revolution about another axis which in the simple mechanism illustrated in a conventional way, in the present drawings is defined by a supporting shaft 25, journaled in standards 26 erected upon a base 27. This carrier also has a movement of rotation about its own axis, the resultant movement of each die when its carrier is rotating and revolving being, of course, a cycloidal one, as indicated in Fig. 8.

The blank, which may be of any suitable material for the purpose, but will usually be a type-metal of proper composition, is designated herein in a general way by $b$, and may be supported by a carrier or holder, such as B, which, in the preferred mode of practicing my improved process, will roll in a straight line in contact with a plane surface, such, for example, as that indicated by C, the slipping of the holder being precluded through the engagement of a tooth $b'$ extending from the holder with a socket $b''$ formed in the surface C. This rolling movement of the blank-carrier will, of course, result in the actuation of the blank in a pure cycloidal path having a cusp at the termini of the two branches of the curve which the blank follows. The position of this cusp should be such as to assure the proper formation of the type, as the face of the latter will not be perfectly shaped unless the cusp is adjacent to the face of the finished type. The manner in which the blank is held by this rolling carrier is immaterial, but in the present case the latter may have a slot therein for receiving the blank. Such slot may serve as a means for guiding the blank when a feed movement is imparted thereto, as is the case herein.

Any suitable means may be employed for imparting this feed movement to the blank, but I prefer to make use of a wedge, such as $w$, adapted to support the blank throughout the length thereof and coacting with an incline, such as $i$, in order to raise the blank gradually.

It will, of course, be evident that either the blank-carrier or the die-carrier might be rolled, and also that either of these members might be fed toward the other, in order to permit the gradual formation of a type. It will also be seen that when the major portion of the work of forming a type is accomplished by rolling and feeding the blank, the type may or may not be partially formed by the movement of the die. In the present case, however, the parts are so disposed and their movements are so timed relatively to each other that each type-die will partially shape its type when brought into working position, and this partial formation of a type will be accomplished before any rolling or feed movement of the blank takes place. The extent to which the type may be shaped will, of course, depend entirely upon the positioning of the die and the blank and upon the movements thereof, and a greater or lesser movement of the die toward the blank will, of course, result in a more complete or only in a partial shaping of the blank. In the present case the parts are so positioned that when any selected die is brought into working position by revolving the die-carrier D about the axis outside itself and simultaneously rotating said carrier about its own axis, said die will be rolled on to the blank and will compress the material of the blank substantially to the extent indicated in Figs. 5, 7, 8, and 9. This initial rolling action will be effected ordinarily by means of a die substantially of the construction shown herein, but other types of dies might be used to accomplish the same result. A special advantage of employing a die of the construction shown in the drawings is that it permits the confinement of a given portion of the type-bar blank endwise thereof by a body which operates as a single mechanical part, and indeed is actually constructed in one piece, although it has many functions that might be carried out by a large number of tools each having a single function. The principal feature of construction that distinguishes the die employed herein from other type-dies is the employment in connection with the die proper of a blade or fin at one or both sides of the die, for the purpose of compressing and displacing a narrow strip of the stock at one or both sides of the point where a type is to be made, and thereby confining endwise of the blank the portion of the stock to be operated upon at any given time for the formation of a type.

The type-dies shown herein have two blades each, one of them being designated by 5 and the other by 5', and as these blades are somewhat thin the notches made by them in the edge of the type-bar blank will be somewhat narrow, as will the strips of material forced out thereby. These blades form a means for confining between them endwise of the bar the material within any given type-field, but as there are no corresponding end walls on the die to check the flowage during compression the material will, of course, be free to flow out crosswise of the bar. Each of the blades 5 and 5' projects, usually throughout its whole length, beyond the outer wall or bottom wall 6 of its die, and hence throughout the whole period during which a type is being formed these blades serve to confine between them the mass of material that is being shaped. The bottom 6 of the die serves to roll out sidewise the major portion of the material not required for the making of a type. The end walls of the die-space, which are indicated herein by 6', intersect the bottom 6 in the usual way, as at 6'', and the edge 6'' serves to shear or cut away from the mass of the bar a type-block or type-blank containing sufficient material to fill the die-space and form a finished type; and that part of the edge of the type-bar blank which is operated upon but is not compressed by the blades 5 and 5', and is not contained within the die-space is obviously compressed by the bottom wall 6 of the die and is rolled off sidewise of the type-bar blank, but is always confined endwise of the bar by the die-blades just mentioned. Hence none of this surplus material is operated upon in such a manner as to force it into the field of an adjacent type, but instead all of the excess, whether it is forced out by the edges of the blades or by the bottom wall 6 of the die, flows sidewise of the blank and may afterward be severed from the bar to bring the sides of the latter into true parallelism with each other.

Ordinarily the material forced out by the blades of the die, and that which is rolled off by the bottom wall 6, will to a considerable extent be gotten rid of during the preliminary stage of the operation of forming a type—that is, when the die is rolled on to the edge of the bar and into working position. The amount of the material displaced during this preliminary rolling on of the die is clearly indicated in Figs. 5, 8, and 9.

According to the mode of operation herein illustrated the remainder of the surplus material that is to be gotten rid of is rolled off during the rolling movement of the blank itself, while the die is located at the working point. When the rolling movement of this blank begins and a feed movement is imparted to one of the members, in this case the blank, a very different action takes place than during the preliminary rolling of the die into position. In fact the major portion of the work of forming a type is effected during the time that the blank is being rolled, and if desired the whole type-forming period may be co-extensive with that in which the blank is operated.

The manner in which, and the extent to which, the type-formative material confined between the die-blades is operated upon are obviously dependent upon the rolling movement of the blank and also upon the feed movement thereof; and as the former is a composite movement, made up of a sidewise swing of the blank and an extra, reciprocatory movement toward and from the die, there will be three factors to determine the points at which, and the extent to which, the material may be subjected to the action of the die during any given period of time. Usually a somewhat rapid feed movement will be imparted to the blank during the early stages of the oscillation thereof, in order that the type may be roughed out rapidly and afterward finished somewhat more slowly as the work approaches completion; but the extent of this advance of the blank toward the die during any given period will be modified by the advance of the blank toward, or its retreat from, the die as said blank follows, in the one direction or the other, one or the other of the two branches of the cycloidal curve. The feed of the blank may be either accelerated by this additional movement or it may be retarded, the retardation serving, of course, to permit the withdrawal of the blank from the die and the acceleration operating to drive the face of the blank against the die with a sharp blow. So long as the blank is operated upon in this manner no arbitrary relation between the rolling movement of the blank and its feed movement need be maintained, but, for the purpose of illustrating the manner in which the blank may be operated to produce good results, I have illustrated in Fig. 10 the extent of the feed movement that may be imparted during any given period of rolling. Here the base line of the chart is divided into thirty-two equal parts, the divisions being indicated at 12 by heavy lines, and the intermediate light lines 13 divide each of these spaces again into two equal parts. The heavy division lines 12 are intended to indicate that during one complete type-making operation the blank may have imparted to it thirty-two semi-reciprocations in a cycloidal path or sixteen complete reciprocations—that is to say, the blank may travel thirty-two times from a normal, central position from the cusp 21' along the path indicated by the cycloidal curve 16' in Fig. 9 until the blank reaches the position indicated by the line 16, and back again along said curve to the cusp 21' when the blank will assume the position indicated by the line 14 the equivalent of this, of course, being the movement from the cusp along the curve 15' until the blank reaches the position indicated by the line 15, and then back to 14—or the blank may travel sixteen times from the central position 14 to 16 to 15 and back again to the central position 14—the equivalent of this, of course, being a movement from 14 to 15 to 16 and back to 14. Thus, those divisions on the chart in Fig. 10, which are indicated by heavy lines 12, correspond to the central position of the blank, as shown by the dotted line 14 in Fig. 9, while the divisions indicated by the light lines 13 correspond to the extreme right-hand and left-hand positions of the blank, which are indicated in Fig. 9 by lines 16 and 15, respectively. Moreover, the odd divisions 13 of this scale indicate the extreme right-hand positions of the blank, as represented by the line 16 in Fig. 9, while the even divisions 13 indicate the extreme left-hand position of said blank, as illustrated by the line 15 in said figure. The curved line 18 is the feed-movement curve, and is one that has been found in practice to be suitable for the purpose. This curve, it will be seen, rises rapidly during the first part of the type-forming operation and more gradually during the later stages thereof. The last line in Fig. 10 (indicated by 33) represents the total feed movement that the blank has during the type-making operation; and the amount of feed movement which the blank has during any single rolling movement thereof in its cycloidal path will, of course, be represented by the difference in vertical height between two adjacent lines 13 marking the beginning and the end of such semi-reciprocation. Thus, during the first quarter-reciprocation of the blank—that is, from the line 14 to the line 16, along the curve 16' from the cusp 21' to the limit of its movement along that branch of the cycloid, as seen in Fig. 9—the blank rises a distance measured by the first line in Fig. 10, while during the next semi-reciprocation— that is, from the line 16 to the line 15, back along the branch 16' to the cusp 21', and then along the other branch 15' of the cycloid to the limits of its movement in that direction—the blank rises a distance equal to the difference between the first and second lines in Fig. 10. Of course it should be understood that the chart shown in Fig. 10 is also drawn to the proper scale to correspond to Fig. 9.

One of the most important features of my improved process is the subjection of the stock to a series of operations by means of which a type may be formed without impairing the strength of the type-formative material of the typebar blank. It has been stated before that these blanks will be a suitable composition of type-metal, and, moreover, they may be in the form of separate type-bar blanks or a continuous strip of ribbon of metal from which the type-bars may be severed after being completed. In every case, however, wrought-metal blanks, formed ordinarily by the usual rolling operations, should be employed, as I have found in practice that cast-metal blanks are undesirable for the purpose and are not so well adapted to be wrought into shape by such operations as are employed in this process. The principal reason for this is that cast metal when rolled and forged in this manner tends to crush and crumble beneath the die instead of compressing and flowing properly, and hence the cast metal will not fill the dies so well as the wrought metal, nor form the smooth faces and sharp edges that the latter will.

The best results that I have been able to obtain in the manufacture of type-bars from cold-metal have been secured by subjecting wrought-metal blanks to such operations as will tend to preserve, instead of impair, the strength of the material. The operations by which this result is obtained are those by which wrought metal is usually formed or to which wrought metal is ordinarily subjected—that is, rolling, swaging, forging, &c.— and by means of these operations types are wrought into form on the edge of a type-bar blank according to my improved process.

While, in the preferred mode of practicing my invention, a single die may be employed for performing all of the operations to which the cold-metal blank is to be subjected, yet it should be understood that the several operations to which it is necessary to subject a solid blank in order to form a wrought-metal type may be carried out in any suitable manner so long as the desired result is obtained. Here, however, the swaging of the face of the type will be performed by the face or inner wall of the die; the rolling will be accomplished chiefly by the base or outer wall of the die and by the edges of the die-blades; and the forging of the type body will be effected principally by means of the end walls of the die, which will usually be considerably inclined in order that the type may be shaped properly and sufficient room left between such walls and the corresponding sides of the type to assure the filling of the die-space during the final stages of the type-making operation.

The manner in which a type is shaped when it is subjected to the action of the die during the cycloidal and feed movements of the blank is somewhat complex, but is clearly illustrated in Figs. 9 to 18, inclusive, which illustrate the appearance of the type during the successive stages of the type-forming operation indicated by the respective figures on the feed-movement curve shown in the chart in Fig. 10.

In Fig. 9 I have illustrated in dotted lines the extent to which the blank would be shaped if it were merely rolled to its extreme right-hand and left-hand positions without being fed toward the die, but these positions are only intended to show how much of the material would be displaced if the rolling movement alone were employed and how the whole face of the blank dips as it follows either branch of the cycloid, and are not intended to illustrate the action that does take place, for the reason that the feed movement begins at the same time as the rolling movement of the blank, and hence the latter is raised at the same time that it is swung sidewise, although, of course, this feed movement is modified by the blank moving bodily as it follows the cycloid. In Fig. 9 I have indicated by the oblique line 19' the extent to which the base line 19, of the type-blank or type-block $t$, sheared out by the cutting edge 6'' of the type-die, is shortened and elevated during the type-forming operation, but these lines do not indicate the total elevation of the blank due to the feed movement alone during any given period, but instead represent the difference between the amount of the advance due to the feed movement and the amount of the withdrawal due to the retreat of the blank from the die along one branch of the cycloid. In other words, said lines show the resultant movement or positions for the respective extreme positions to which the blank is rolled. Said lines indicate the results for each of the thirty-three positions on the chart in Fig. 10, but, of course, it should be understood that in Fig. 9 these oblique lines merely indicate the theoretical positions for the various movements and do not show, and are not intended to show, the exact manner in which the metal rises in the die-space and fills the same during the operation, the latter feature being illustrated approximately in Figs. 11 to 18, inclusive, for certain stages of the operation.

As the blank is rolled toward the right and toward the left alternately and is simultaneously fed toward the die, the stock at the base of the type-block or type-blank $t$ is forged first at the right-hand side, as shown in Fig. 11, and then at the left-hand side, as shown in Fig. 12, the forging action being, of course, greatest near the base of the type-block, because the sidewise movement of the type-block is greatest at that point. The forging action, however, extends up the entire length of the side being operated upon and results in a thorough compacting or condensing of the particles of the blank. The forging action being greatest at the base of the type-blank the latter will be strengthened most in the region of its base, but the strengthened base will also be connected with the face of the type by a thick layer of condensed metal thoroughly compacted by the forging operation. The forging of these type-faces is not effected in this case in a regular manner, but the action which takes place is apparently this: As the blank is fed toward the die and is rolled in either direction from the normal central position, it travels in a path beginning at the cusp 21' and following the corresponding branch of the cycloid until the face of the type-blank has retreated, say about a twelfth of an inch, from the die, by which time the cutting edge 6'' will have sheared the type-block somewhat more than it was sheared by the rolling of the die into position, but not to the same extent that such block would be sheared by the oscillation of the blank about 21' as a fixed point, as in my companion application hereinbefore mentioned. On the return, however, of the blank, as it follows the cycloid toward the cusp, the feed movement, which on the downward roll was decreased by the amount of the withdrawal of the blank from the die in following the cycloid, will be increased by the same amount, and hence while the movement of the blank away from the die will always retard its feed in the rolling operation, its advance toward the die will always accelerate the feed in practicing the rolling process of forming type from a solid blank. Hence while the forging action and the shearing action will be diminished as the blank retreats from the cusp, as compared with the oscillating process of forming a type, both of these actions seem to be increased, as compared with the oscillating process, as the blank advances toward the cusp, owing to the greater movement of the blank toward the die during this period. At the same time that this metal is compressed by the forging action of the end walls 6' of the die-space the central portion of the type-blank is forced upward into the die, owing to the resistance opposed to forging action by the opposite walls 8 and 8' of the die-space. This action is apparently greatest during the advance of the blank along the cycloid toward the cusp and toward the face of the die, owing to this accelerated and increased movement of the blank at this time. At each roll of the blank toward one of its extreme positions the metal so forced up tends to fill one side of the space 9, while the opposite side of said space, and the space 9' formed by the withdrawal of the lower portion of the other side of the type-blank from the opposite wall 6' of the die-space, form an outlet through which the air confined between the type-blank and the die may escape. When the material is forced up to fill the die the latter serves not only to swage the face of the type-blank by pressure, but the impact of the die against the type-blank, due to the accelerated and increased movement of the blank, also results, when the two members are brought together, in the swaging of the face of the blank, by a sharp blow, thus assuring the filling of all the sharp corners and hair-line spaces of the die.

As the operation continues and the blank is rolled first to one side and then to the other the opposite ends of the type-block, especially near the base thereof, are more and more condensed by the forging operation, and the upper portion or head of the type-block is forced up farther and farther until the metal completely fills the die-space. The gradual increase in the areas of the condensed metal resulting from the repeated forging operations is indicated approximately in Figs. 11 to 18, inclusive, principally by cross-hatching but partly by stippling, while those areas which are merely swaged as the one member is fed toward the other are indicated by stippling alone. It should be understood, however, that the manner in which, and the extent to which, the type-blank is forged, sheared, and swaged are not, and are not intended to be, exactly illustrated herein, but the positions are merely illustrative, for the purpose of showing with approximate accuracy the mode of forming a type in cold metal when the movements of the rolling member are alternately accelerated and retarded, and thus alternately increased and diminished as the process continues.

As the two main movements—viz., the roll and the feed—continue, the cutting edge 6'' of the die shears into the metal of the type-bar blank and gradually completes the cutting out of the type-block or type-blank from the mass of the metal. This type-blank, it will be seen, is not completely sheared from the type-bar blank until the actual completion of the making of the type. In other words, the shearing of the type-blank and the formation of a type from that type-blank are substantially coincident when my improved process is carried out in the manner just described. Each time that a feed movement and an oscillation occur an additional portion of the surplus material confined between the die-blades 5 and 5' is forced out sidewise of the blank both by the lower edges of these blades and by the bottom wall 6. After such portion of the surplus has been forced out sidewise in this manner the cutting edge 6'' at the next operation shears further into the body of the blank, and the metal at the point at which such cutting edge previously operated is forced farther out toward or beyond the side of the bar. The result is that when the type is completed those faces of the surplus material which are in contact with the outer wall 6 of the die and are rolled throughout present the appearance of plane faces cut by a series of parallel lines or serrations, as shown clearly in Fig. 18, and also as seen in Fig. 3. These lines correspond in contour to that of the cutting edge by which they are formed.

In order to fill the die completely and thus form a perfectly-finished type, it is desirable to shorten the path that the blank follows along the two branches of the cycloid during the latter portion of the type-forming operation and finish the type by a simple feed movement after the cycloidal reciprocations have ceased. The manner in which the material is shaped when the blank is operated upon in this way is clearly shown in Figs. 15 to 18, inclusive, the first three of which show how the forging action is varied by the gradual shortening of the cycloidal path traversed by the blank, and also show how the clear space at that side of the base of the blank which is not being forged gradually decreases in size, and hence how the die-space gradually fills up more and more as the operation approaches completion. The numerals 25', 26', 27', and 28', in Fig. 9, indicate the respective positions to which the blank is rolled as the cycloidal movement thereof is progressively decreased, and these positions correspond to the twenty-fifth, twenty-sixth, twenty-seventh, and twenty-eighth positions represented on the chart in Fig. 10. During the final stages of the operation, when the cycloidal movement ceases, the die will operate principally as a means for swaging the face of the type to its finished form. Of course when the die and the blank are separated they should withdraw from one another in such a manner as not to mar the finished type.

It will be apparent from the foregoing that during the early stages of the type-making operation one of the two members that coöperate to form the type will be reciprocated in a cycloidal path of fixed length, which will vary and gradually decrease until it disappears entirely just before the operation is concluded, the path in which the blank reciprocates or oscillates in this case extending, as will be evident, at first for equal, short distances along two branches of the cycloid which meet in a cusp, and afterward for unequal and progressively-decreasing, short distances along these cycloidal branches until the movement ceases. Thus, not only may the feed movement of one of these members be varied while the type is being formed, but the cycloidal movement of the rolling member may also be varied during the period of the variable feed movement and may cease entirely before the latter.

The location of the cusp may vary somewhat in practice, but in every case I deem it desirable that it be either in or below the face of a finished type.

After any one type has been formed on the type-bar blank another may be shaped in substantially the same way, as is clearly shown in Fig. 4, but in every case the blade or fin 5 should be so located as to lie close to the side of the next, adjacent, finished type in order that the types when finished may be sufficiently close to one another.

The fins $f$ and $f''$, which are rolled off from the sides of the bar by the bottom wall of the die and by the edges of the blades 5 and 5', respectively, (chiefly by the surface 6 and 5',) may be removed at any proper time and in any suitable manner, a pair of cutting-tools, such as $c$, being shown herein for the purpose, these preferably operating after a series of types has been formed.

It should, of course, be understood that the spaces between groups of letters or words may be formed in any suitable way, but preferably by means of blank dies (not shown) which will roll the metal off in substantially the manner just described, but will leave the faces of the blank spaces or space types considerably below the faces of the others, as illustrated in Fig. 2. These blank spaces may be of any suitable width and, of course, the letters themselves will be of varying widths, but in all cases it is desirable to form between the words spaces of such width as to make type-bars of uniform lengths, whether the blank spaces be of the same width or of varying widths, thus assuring the formation of type-bars having the types thereon properly composed and spaced.

The simple organization of mechanism indicated in the drawings hereto attached illustrates one adapted to make type and lines of type according to the method hereinbefore disclosed. After the proper die $d$ on a carrier D (two such carriers being here shown) shall have been selected and rolled onto the edge of the blank at the proper point, the shaft 25 may be locked against further movement by means of a spring-pressed detent lever, such as 28, which may be engaged with the proper notch in a notched wheel 29 secured to the shaft. Means, such as an insertible locking pin 30, is also here provided for holding the die carrier in its adjusted position.

A longitudinal movement is imparted to the wedge $w$ for the purpose of feeding the blank upward against the die from a cam shaft 31 by means of a cam 32 which, through suitable transmitting devices, designated in a general way by 33, is effective to turn a toothed segment 34, this segment meshing with a toothed portion of the wedge. A crank handle 35 enables the cam shaft 31 to be readily turned, and by making the cam 32 of the proper contour any desired character of feed movement of the blank against the die may be obtained.

For the purpose of reciprocating the holder B, I have here shown a vibratory plate 36 whose vibratory movement is effected from a crank pin 36' driven from a shaft 37, actuated by a driving pulley 38 from any suitable source of power. The motion of this plate is transmitted to the holder by means of a link 39, and if the pivotal connection of the link with the plate is made shiftable toward and away from the axis of vibration of the latter, as by pivotally connecting the link with a slide block 39', mounted on the plate and effecting the adjustment of this block by a cam, such as 40, on the shaft 31 (suitable transmitting connections, such as 41, being of course provided), the imparted reciprocation may be varied during the progress of the type-forming operation, as already explained. A feed screw 42 is also indicated, the same being effective to shift the holder-supporting carriage 43 step by step transversely to the plane of reciprocation of the dies in order to bring consecutive portions of the edge of the blank to the type-making point. In order to insure the proper action of the feeding and reciprocating mechanism regardless of the position occupied by the holder B, the cam 32 is splined to the shaft 31 and is compelled to travel with the holder in its movement by means of a bifurcated projection 44 on the carriage, which enters a groove 44' in the body of the cam, while a rod 45 extending lengthwise of the holder engages with an eye in the end of the link 39, this latter being confined by a vertical guide 46 to movement in a vertical plane.

In Fig. 19 I have illustrated a modification of this rolling process, in which instead of rolling one of the carriers in a straight line against a plane surface it is rolled in an arc of a circle, preferably in an arc struck from a radius of the same length as the radius of such carrier. Here this curved surface, against which the blank-carrier (indicated by B') rolls, is indicated by C'. The principal difference between the rolling movement against a plane surface and that illustrated in Fig. 19 is that in that latter the cycloidal movement is substantially twice as great as in the former when the blank is moved through a given distance. The dotted lines in Fig. 19 show the positions which would be assumed by the blank if it were rolled to its respective extreme positions without being fed toward the die. By comparing Figs. 19 and 9 it will be seen that in the former the resultant movement of the blank toward the die, when the blank is fed toward the die and at the same time retreats from the cusp along either branch of the cycloidal curve, is greater when this process is practiced by rolling the carrier against the curve than when it is rolled against a plane surface. The two branches 15″ and 16″ of the epicycloid in Fig. 19 also retreat from each other more rapidly than the two branches 15' and 16' of the cyloid illustrated in Fig. 9. Hence while both of these rolling processes are of substantially the same nature, yet in rolling against the curve the resultant movement of the blank toward the die will vary in a somewhat different manner, and the sidewise movement of the blank as it follows the two branches of the epi-cycloid will also be different. The difference in the positions of the oblique lines, showing the gradual shortening of the theoretical base line of the partially-formed type-blank, will also be apparent on comparing Figs. 9 and 19, in the latter of which said lines are designated by 19″.

Having thus described my invention, I claim:

1. That improvement in the art of making a type by subjecting a blank to the compressing action of a type-die, which consists in confining endwise of the blank a portion of the edge of a type-bar blank, and imparting to one of said members a rolling movement while the die is in contact with the confined portion of the blank.

2. That improvement in the art of making a type, which consists in confining endwise of the blank a portion of the edge of a type-bar blank, and moving said blank in an epicycloidal path while said confined portion is in contact with a type-die, and thereby forming a type.

3. That improvement in the art of making a type by compressing the edge of a type-bar blank in contact with a type-die, which consists in imparting a varying reciprocatory rolling movement to one of said members while in contact with the other, and thereby forming a type.

4. That improvement in the art of making a type by compressing the edge of a type-bar blank in contact with a type-die, which consists in imparting to one of said members while in contact with the other a reciprocatory rolling movement in a path of variable length, and thereby forming a type.

5. That improvement in the art of making a type on the edge of a type-bar blank, which consists in reciprocating one of said members in an epicycloidal path of variable length while in contact with the other, and thereby forming a type.

6. That improvement in the art of making a type on the edge of a type-bar blank, which consists in imparting to a blank while in contact with a type-die a reciprocatory rolling movement, first in a path of fixed length, and then in a path of progressively-decreasing length, and thereby forming a type.

7. That improvement in the art of making a type on the edge of a type-bar blank, which consists in imparting a transverse rolling movement to a blank while in contact with a type-die, and thereby forming a type.

8. That improvement in the art of making a type, which consists in confining endwise of the blank between two separated lines a portion of the edge of a type-bar blank, and imparting to said blank a rolling movement in a direction transverse to the blank while the confined portion thereof is in contact with the type-die, and thereby forming a type.

9. That improvement in the art of making a type which consists in working the type formable material of the blank by a rolling movement diminishing in extent as the type approaches its completion.

10. That improvement in the art of making a type, which consists in confining endwise of the blank a portion of the edge of a type-bar blank, imparting a rolling movement to said blank while the confined portion thereof is in contact with a type-die and forcing surplus material beyond the sides of the blank, and afterward separating said surplus material from the blank.

11. That improvement in the art of making a type, which consists in confining endwise of the blank a portion of the edge of a type-bar blank, imparting to said blank a transverse rolling movement while the confined portion thereof is in contact with a type-die and forcing surplus material beyond the sides of the blank, and afterward separating said surplus material from the blank.

12. That improvement in the art of making lines of type, which consists in bringing selective type dies successively into contact with the blank at proper points thereof, and in working the type formable material by a rolling movement at each successive location of the die, such movement diminishing in extent as the type approaches its completion.

13. That improvement in the art of making lines of type, which consists in bringing selective type dies successively into contact with the blank at proper points thereof, and rolling the material of the blank with each individual die crosswise of the blank.

14. That improvement in the art of making a type, which consists in confining endwise of the blank a portion of the edge of a type-bar blank, and simultaneously rolling the blank and feeding the same toward a type-die while the confined portion of the blank is in contact with said die.

15. That improvement in the art of making a type by compressing the edge of a type-bar blank in contact with a type-die, which consists in imparting a rolling movement to one of said members while in contact with the other, and simultaneously feeding one of said members toward the other with a variable movement, and thereby forming a type, 16. That improvement in the art of making a type by compressing the edge of a type-bar blank in contact with a type-die, which consists in imparting to one of said members while in contact with the other a rolling movement in a path of variable length, and simultaneously feeding one of said members toward the other with a variable movement, and thereby forming a type.

17. That improvement in the art of making a type by compressing the edge of a type-bar blank in contact with a type-die, which consists in feeding one of said members toward the other while in contact therewith, and imparting to one of said members a rolling movement in a path of variable length during a portion of the feed movement, and thereby forming a type.

18. That improvement in the art of making a type by compressing the edge of a type-bar blank in contact with a type-die, which consists in feeding one of said members toward the other while in contact therewith, and imparting to one of said members during the early stages of such feed movement a rolling movement, first in a path of fixed length, and then in a path of progressively-decreasing length, and thereby forming a type.

19. That improvement in the art of making a type by compressing the edge of a type-bar-blank in contact with a type-die, which consists in feeding the blank and die toward each other at a speed decreasing in the latter stages of such feed, and in imparting to one of the members a reciprocatory rolling movement the amplitude of whose reciprocations also decreases in the later stages of such reciprocatory movement.

20. That improvement in the art of making a type by compressing the edge of a typebar-blank in contact with a type-die, which consists in feeding the blank and die toward each other at a speed decreasing in the later stages of such feed, and in imparting to one of the members a reciprocatory rolling movement with a rapidity also decreasing in the later stages of such reciprocatory movement.

21. That improvement in the art of making lines of type, which consists in bringing selective type dies successively into contact with the blank, in rolling the material of the blank with each individual die crosswise of the blank, and in simultaneously feeding the type-making members together.

22. That improvement in the art of making lines of type, which consists in bringing selective type dies successively into contact with the blank, in rolling the material of the blank with each individual die crosswise of the blank, and to an extent varying with the progress of the type formation and in simultaneously feeding the type-making members together at a varying rate.

23. That improvement in the art of making a line of type which consists in subjecting each successive type-blank portion of the blank to a working by a rolling movement directed transversely to the blank, thereby forming and completing each type before the next type in advance is begun, each such movement diminishing in extent as the type approaches its finished condition.

24. That improvement in the art of making a type by compressing the edge of a typebar-blank in contact with a type-die, which consists in imparting in a path of variable length a rapid reciprocatory rolling movement to one of said members while in contact with the other, and thereby forming a type.

25. That improvement in the art of making a typebar by compressing, at each of a number of places, the edge of a typebar-blank in contact with a type-die, which consists in imparting a rolling movement to one of said members while in contact with the other, and simultaneously feeding one of said members toward the other, and thereby forming a type.

26. That improvement in the art of making a type, which consists in imparting a rolling movement to a blank while the edge of the latter is in contact with a type-die, and simultaneously feeding the blank toward the die, and thereby forming a type.

27. That improvement in the art of making lines of type, which consists in bringing selective type-dies successively into contact with a blank, and rolling the material of the blank with each individual die.

Signed at my offices, Nos. 9 to 15 Murray street, New York, N. Y., this 23rd day of February, 1907.

FRANCIS H. RICHARDS.

Witnesses:
   JOHN O. SEIFERT,
   F. E. BOYCE.